//  US010714966B2

(12) United States Patent
Shields et al.

(10) Patent No.: US 10,714,966 B2
(45) Date of Patent: Jul. 14, 2020

(54) ISOLATION SWITCH OPERATION

(71) Applicant: Ford Global Technologies, LLC, Dearborn, MI (US)

(72) Inventors: Mark E. Shields, Plymouth, MI (US); Matthew Thomas Loiselle, LaSalle, MI (US); Brian Keyse, Farmington Hills, MI (US); Josephine S. Lee, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/956,233

(22) Filed: Apr. 18, 2018

(65) Prior Publication Data

US 2019/0326772 A1     Oct. 24, 2019

(51) Int. Cl.
| | |
|---|---|
| *B60W 10/06* | (2006.01) |
| *B60W 20/00* | (2016.01) |
| *H02J 7/14* | (2006.01) |
| *H02J 9/04* | (2006.01) |
| *H02J 7/00* | (2006.01) |
| *B60L 50/10* | (2019.01) |
| *B60L 50/50* | (2019.01) |

(52) U.S. Cl.
CPC ............ *H02J 7/1446* (2013.01); *B60L 50/10* (2019.02); *B60L 50/50* (2019.02); *H02J 7/0031* (2013.01); *H02J 9/04* (2013.01)

(58) Field of Classification Search
CPC ...... B60W 10/06; B60W 10/08; B60W 10/26; B60W 20/00; B60W 20/50; B60W 2710/08
See application file for complete search history.

(56) References Cited

U.S. PATENT DOCUMENTS

| | | | |
|---|---|---|---|
| 6,066,899 A | 5/2000 | Rund et al. | |
| 6,646,845 B1 * | 11/2003 | Turner | H02J 9/002 307/10.7 |
| 8,121,748 B2 | 2/2012 | Jeon et al. | |
| 8,606,447 B2 * | 12/2013 | Namuduri | B60W 20/00 701/22 |
| 9,143,056 B2 | 9/2015 | Ilic et al. | |
| 9,597,963 B2 * | 3/2017 | Slosarczyk | H02J 7/1423 |
| 2008/0011528 A1 * | 1/2008 | Verbrugge | B60K 6/28 180/65.29 |
| 2015/0275841 A1 * | 10/2015 | Sakata | B60R 16/033 123/179.28 |
| 2016/0229403 A1 * | 8/2016 | Khafagy | B60W 30/18 |

* cited by examiner

*Primary Examiner* — Bryan A Evans
(74) *Attorney, Agent, or Firm* — David Kelley; Brooks Kushman P.C.

(57) ABSTRACT

A vehicle includes a starter motor having a dedicated power source, an electric machine, and a controller configured to, responsive to a command for the motor to start an engine, open a switch to isolate the motor and source from a network electrically connected with the machine, and responsive to voltages on both sides of the switch falling within a predetermined range, close the switch to charge the source.

18 Claims, 3 Drawing Sheets

ISOLATION SWITCH OPERATION

TECHNICAL FIELD

The present disclosure relates to systems and methods for controlling operation of an isolation switch.

BACKGROUND

A hybrid or an electric vehicle may be equipped with at least one traction battery configured to provide energy for propulsion. The traction battery may also provide energy for other vehicle electrical components. For example, the traction battery may transfer energy to high voltage loads, such as compressors and electric heaters. In another example, the traction battery may provide energy to low voltage loads.

SUMMARY

A vehicle includes a starter motor having a dedicated power source, an electric machine, and a controller configured to, responsive to a command for the motor to start an engine, open a switch to isolate the motor and source from a network electrically connected with the machine, and responsive to voltages on both sides of the switch falling within a predetermined range, close the switch to charge the source.

A method for a vehicle includes, responsive to a command for a starter motor to start an engine, by a controller opening a switch to isolate the motor and source from a network electrically connected with an electric machine that is configured to propel the vehicle, and responsive to voltages on both sides of the switch falling within a predetermined range, by the controller closing the switch to charge the source.

A system for a vehicle includes a traction battery, a DC-DC converter configured to receive current from the traction battery, a starter motor having a dedicated power source configured to selectively receive current from the converter, and a controller configured to, responsive to a command for the motor to start an engine, open a switch to isolate the motor from the converter.

DETAILED DESCRIPTION

Figure 1:
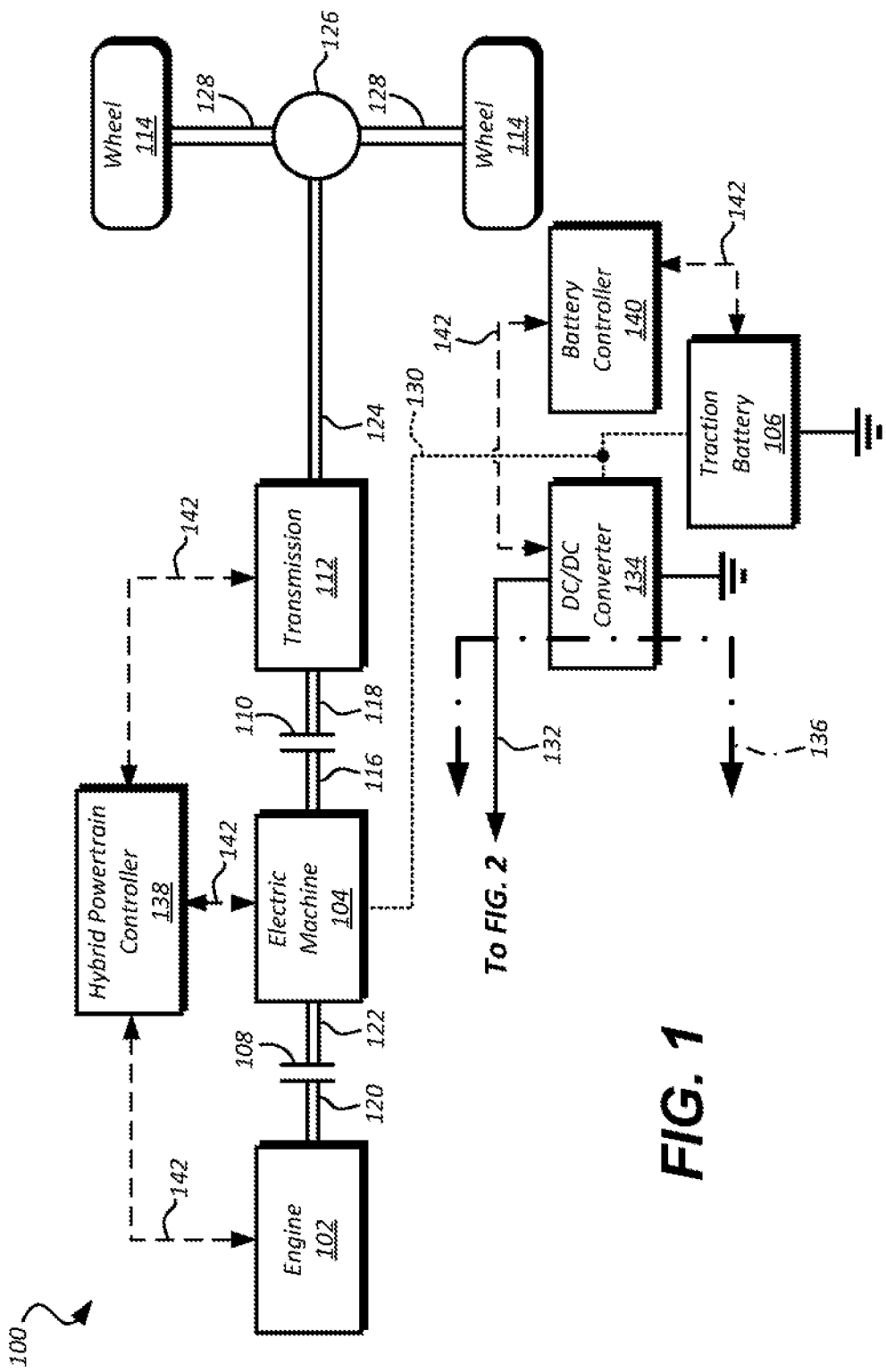
FIG. 1 is block diagrams illustrating an example hybrid electric vehicle (HEV)

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A hybrid or electric vehicle may include both main and auxiliary electrical buses. The main electrical bus (hereinafter, main bus) may be connected to one or more electrical machines, an engine, and a traction battery and may be configured to transfer electrical and/or electro-mechanical energy to propel the vehicle. The auxiliary electrical bus (hereinafter, auxiliary bus) may be connected to one or more auxiliary batteries configured to selectively power vehicle operations, such as, but not limited to, engine cranking, cabin and propulsion system climate control, cabin lighting, vehicle audio system, and so on. In some cases, the auxiliary batteries may power the accessory features when vehicle engine or ignition are in a predefined operating state. For example, the auxiliary batteries may power accessory lighting when the engine of the vehicle is turned off. The auxiliary batteries of the auxiliary bus may operate separately from, or in combination with, energy sources of the main bus.

The auxiliary bus may be connected to an isolation device configured to selectively disconnect and/or electrically isolate several portions of the auxiliary bus. For example, the auxiliary batteries may be electrically in series with an isolation switch, such that, when the switch is open, at least one of the auxiliary batteries may be electrically isolated from other portions of the auxiliary bus. Additionally or alternatively, closing the switch may electrically connect the auxiliary batteries to other portions of the auxiliary bus to permit energy flow therethrough.

In some instances, when the isolation switch is commanded closed a high in-rush current may affect operation of the isolation switch. The in-rush current may, for example, result from a voltage difference between the auxiliary batteries and the auxiliary bus being greater than a threshold. In some other instances, controlling voltage of the auxiliary bus, prior to commanding the isolation switch to close, may minimize or prevent in-rush current flow through the isolation switch. In still other instances, controlling voltage of the auxiliary bus may include commanding the isolation switch to close responsive to a difference between respective voltages of the auxiliary bus and the auxiliary batteries being less than a threshold. In yet other instances, after completing engine crank and prior to commanding the isolation switch to close, the control logic may control voltage of the isolation switch of the isolated side to match the voltage measured at the isolated auxiliary battery.

FIG. 1 illustrates an example hybrid electric vehicle (hereinafter, vehicle) 100. The vehicle 100 includes an engine 102, one or more electric machines 104 capable of operating as one or both of an electric motor and generator, a traction battery 106, a disconnect clutch 108, a torque converter 110, and a multiple-ratio automatic transmission 112. The vehicle 100 further includes a hybrid powertrain controller 138 configured to monitor and control 142 operation of one or more components of the vehicle 100.

The engine 102 and the electric machine 104 are drive sources for the vehicle 100. The engine 102 is connectable to the electric machine 104 through the disconnect clutch 108, such as, for example, via an engine output shaft 120 connectable to a motor input shaft 122, whereby the engine 102 and the electric machine 104 may be connected in series. The electric machine 104 is connected to the torque converter 110. The torque converter 110 is connectable to the engine 102 via the electric machine 104, such as, for example, when the engine 102 is connected to the electric machine 104 via the disconnect clutch 108. In one example, a motor output shaft 116 may be connected to an impeller of the torque converter 110.

The torque converter 110 is further connected to the transmission 112. In one example, a turbine of the torque converter 110 may be connectable to a transmission input shaft 118. The transmission 112 is connected to a differential 126 via a transmission output shaft 124 and drive wheels 114 are connected to the differential 126 through respective axles 128. The driving force applied from the engine 102 and/or the electric machine 104 is transmitted through the torque converter 110 and the transmission 112 to the drive wheels 114 thereby propelling the vehicle. In an example arrangement, the torque converter 110 may further include a torque converter clutch, e.g., a bypass clutch. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque. In one example, the transmission 112 may be automatically shifted from one ratio to another based on the needs of the vehicle 100.

In an example arrangement, the engine 102 may be a primary source of power for the vehicle 100. The engine 102 may be an internal combustion engine, such as a gasoline, diesel, or natural gas-powered engine. The engine 102 generates engine torque that is supplied to the electric machine 104 when the engine 102 and the electric machine 104 are connected via the disconnect clutch 108. To drive the vehicle with the engine 102, at least a portion of the engine torque passes from the engine 102 through the disconnect clutch 108 to the electric machine 104 and then from the electric machine 104 through torque converter 110 to the transmission 112.

The traction battery 106 in some arrangements may be a secondary source of power for the vehicle 100. The traction battery 106 may comprise a plurality of battery cells (not illustrated), e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor.

The traction battery 106 may be connected to and in communication 142 with a battery controller 140. In one example, the battery controller 140 configured to control the plurality of connectors and switches, e.g., contactors. In such an example, the battery controller 140 may command one or more contactors to open or close connecting or disconnecting the traction battery 106 from other vehicle 100 components. The battery controller 140 may be electrically connected to and in communication 142 with one or more other vehicle controllers, such as, but not limited to, a body controller, a climate control controller, a brake controller, and so on, and may command one or more contactors to open or close in response to receiving a signal from the other vehicle controllers. In an example, the battery controller 140 may be in communication with the hybrid powertrain controller 138 and may command the contactors to open or close in response to a signal from the hybrid powertrain controller 138.

The battery controller 140 may be further configured to receive signals from a plurality of vehicle 100 sensors, such as, but not limited to, battery voltage sensor, battery current sensor, battery temperature sensor, ambient temperature sensor, and so on. The battery controller 140 may command one or more contactors to open or close in response to receiving a signal from the one or more vehicle sensors. While the traction battery 106 is described as including electrochemical cells, other types of energy storage device implementations, such as capacitors, are also contemplated.

The traction battery 106 is electrically connected 130 to the electric machine 104, such that energy stored in the traction battery 106 can be used and/or replenished by the electric machine 104. The connection (illustrated generally as a dotted line) 130 between the traction battery 106 and the electric machine 104 may be a high voltage connection configured to transfer voltages greater than 50 volts (V). In one example, the electric machine 104 may be electrically connected to an inverter (not illustrated) providing bi-directional energy transfer between the electric machine 104 and the traction battery 106. When the electric machine 104 operates in a motor mode, the inverter may convert high voltage direct current (DC) output provided by the traction battery 106 to a three-phase alternating current (AC) as may be required for proper functionality of the electric machine 104. When the electric machine 104 operates in a regenerative mode, the inverter may convert the three-phase AC output from the electric machine 104 acting as a generator to the DC input required by the traction battery 106. In addition to providing energy for propulsion, the traction battery 106 may provide energy for other vehicle electrical components, such as one or more high-voltage loads (not illustrated), e.g., compressors and electric heaters, that operate using voltages greater than 50V.

The traction battery 106 may be configured to provide energy to a low voltage DC supply that is compatible with other vehicle loads. A DC/DC converter 134 may be connected between a low voltage connection 132 used by one or more low voltage subsystems or components and the high voltage connection 130 used by, for example, the electric machine 104 and the traction battery 106. The high and low voltage connections 130, 132 may be electrical circuit connections that operate to transfer respective amounts of electrical current, withstand respective amounts of voltage differential, and so on, that are different from one another. As one example, the high voltage connection 130 may be configured to transfer electrical current greater than electrical current transferred by the low voltage connection 132. As another example, the high voltage connection 130 may have associated operating voltage greater than operating voltage associated with the low voltage connection 132.

In some instances, the DC/DC converter 134 may be a bi-directional buck-boost converter configured to convert power flowing to and from the high voltage connection 130 and the low voltage connection 132. For example, in buck mode the DC/DC converter 134 may reduce ("buck") the high voltage DC output of the traction battery 106 to low voltage DC input required by the low voltage connection 132 components. In another example, the DC/DC converter 134 operating in a boost mode may increase ("boost") the low voltage DC output of the low voltage connection 132 components to a high voltage DC input compatible with the traction battery 106.

Figure 2:
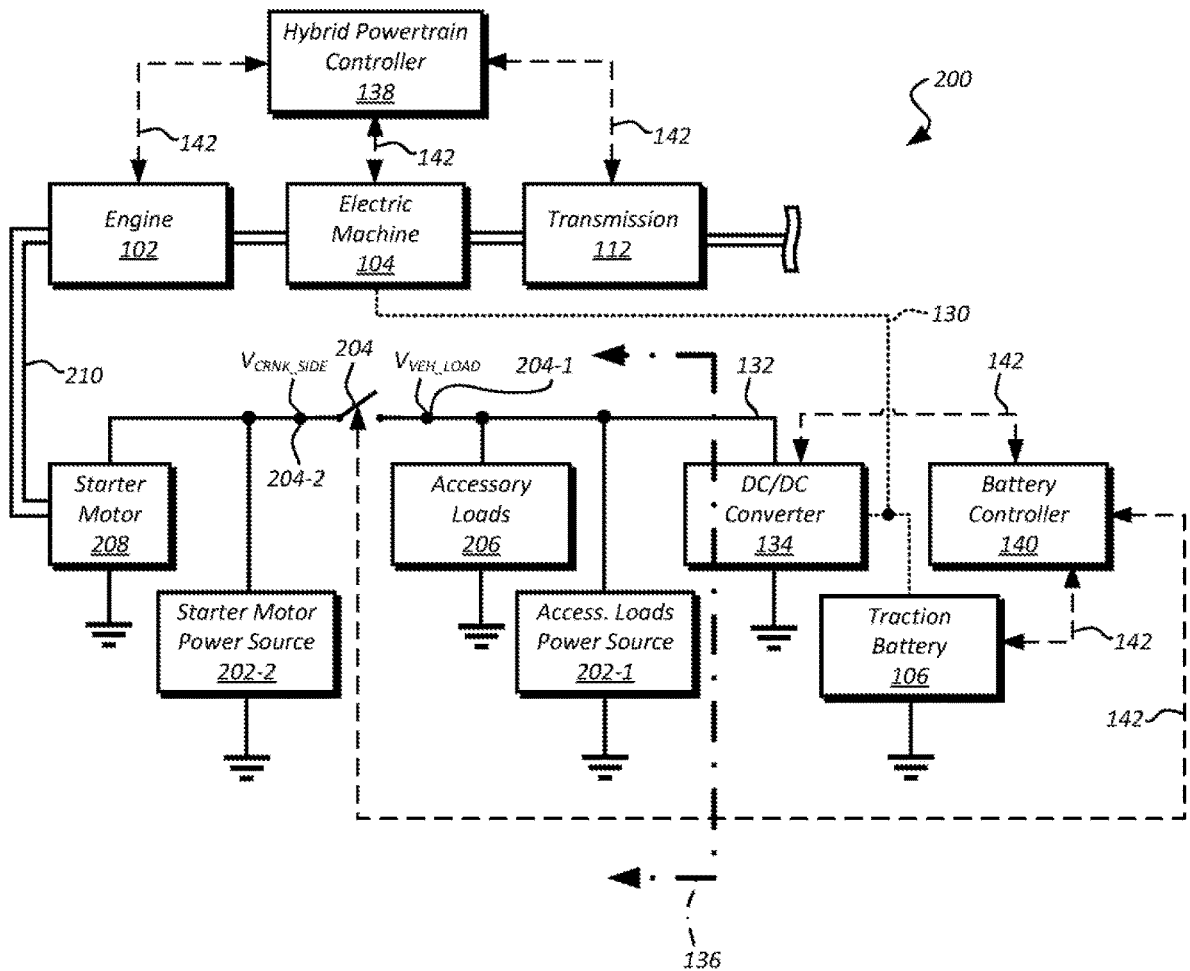
FIG. 2 is a block diagram illustrating an example vehicle electrical distribution network.

As described further in reference to at least FIG. 2, the battery controller 140 may monitor and control operation of the DC/DC converter 134 and the low voltage subsystems or components, such as activating the converter 134 to charge or discharge the low voltage connection 132 components, activating the low voltage connection 132 components to transfer power to assist propulsion, energize or deenergize the low voltage connection 132 components when the engine 102 is turned off, permit or inhibit activation of the converter 134, and so on. Additionally or alternatively, the DC/DC converter 134 and some or all of the low voltage connection 132 components may be configured to receive command signals from the hybrid powertrain controller 138. In some instances, the low voltage subsystems or components electrically connected with one another and with other portions of the vehicle 100 electrical distribution network via the low voltage connection 132 may be generally referred to as a low voltage bus 136.

FIG. 2 illustrates an example vehicle electrical distribution network arrangement 200 for isolating at least a portion of the low voltage bus 136. The low voltage bus 136 may be an electrical bus electrically connecting together one or more low voltage connection 132 components, such as, but not limited to, a pair of power sources 202-1 and 202-2, an isolation switch 204, accessory loads 206, and an engine starter motor (hereinafter, starter motor) 208.

The accessory loads power source 202-1 connected to the low voltage connection 132 may be configured to provide energy to the accessory loads 206, such as, but not limited to, cabin and propulsion system climate control, cabin lighting, vehicle audio system, and so on. Other examples of powering the accessory loads 206 may be one or more electrical loads of the vehicle 100 during ignition off and/or engine off states.

The starter motor power source 202-2 may be electrically connected to and configured to power the starter motor 208. The starter motor 208 may be configured to selectively start the engine 102, such as by engaging 210 an engine flywheel, responsive to a signal from one or more vehicle controllers and/or sensors. As another example, the hybrid powertrain controller 138 may be configured to command the starter motor 208 to start the engine 102 responsive to one or more of ambient temperature being less than a predetermined temperature threshold, e.g., cold start, available traction battery 106 power being less than a power threshold, available starter motor power source 202-2 power being greater than a first power threshold, and so on.

The hybrid powertrain controller 138 may start the engine 102 responsive to a signal or request from one or more other vehicle controllers and/or sensors, e.g., brake and/or accelerator pedal position sensor, crank angle sensor, and so on. In some examples, the hybrid powertrain controller 138 may determine whether the engine 102 may be started using energy of the traction battery 106, the starter motor power source 202-2, or some combination thereof, based on one or more vehicle operating parameters. Examples of the vehicle operating parameters that may affect starting of the engine 102 include, but are not limited to, detected temperature of the engine 102 and traction battery 106, detected ambient temperature, available traction battery 106 power, and available starter motor power source 202-2 power, among others.

The isolation switch 204, when open, may be configured to electrically isolate one or more low voltage connection 132 components from others using a same low voltage connection 132 and/or from one or more high voltage connection 130 components, such as, but not limited to, the traction battery 106 and the electric machine 104. In one example, the isolation switch 204, when open, electrically isolates both the starter motor power source 202-2 and the starter motor 208 from all other electrical connections and components of the vehicle 100, e.g., all other low voltage connection 132 components, all high voltage connection 130 components, and so on.

Additionally or alternatively, the isolation switch 204, when closed, may be configured to electrically connect one or more low voltage connection 132 components to other components using a same low voltage connection 132 and/or to one or more high voltage components using the high voltage connection 130, such as, but not limited to, the traction battery 106 and the electric machine 104. Said another way, the isolation switch 204, when closed, electrically connects both the starter motor power source 202-2 and the starter motor 208 to all other electrical connections and components of the vehicle 100, e.g., all other low voltage connection 132 components, all high voltage connection 130 components, and so on.

The battery controller 140 may monitor and control operation of the isolation switch 204. For example, the battery controller 140 may selectively operate the isolation switch 204 to open and close responsive to one or more vehicle 100 operating conditions being met. As one example, responsive to a request to start the engine 102 using the starter motor 208 powered by the starter motor power source 202-2, the battery controller 140 may cause the isolation switch 204 to open to isolate both the starter motor power source 202-2 and the starter motor 208 from all other electrical connections and components of the vehicle 100, e.g., all other low voltage connection 132 components, all high voltage connection 130 components, and so on.

Additionally or alternatively, responsive to the engine 102 being started, the battery controller 140 may cause the isolation switch 204 to close to connect both the starter motor power source 202-2 and the starter motor 208 to all other electrical connections and components of the vehicle 100, e.g., all other low voltage connection 132 components, all high voltage connection 130 components, and so on.

In one example, when the switch 204 is open, a first terminal 204-1 of the isolation switch 204 may be connected to the electrical connections and components of the vehicle 100 being isolated, i.e., all electrical connections and components, except those of the starter motor power supply 202-2 and the starter motor 208, that may be collectively referred to as a vehicle load. In another example, when the switch 204 is open, a second terminal 204-2 of the isolation switch 204 may be electrically connected to both the starter motor power supply 202-2 and the starter motor 208 and may be electrically isolated or disconnected from all other electrical connections and components, that may together be referred to as a crank side.

The battery controller 140 may be configured to measure vehicle load voltage $V_{VEH\_LOAD}$ at the first terminal 204-1 of the isolation switch 204 and measure crank side voltage $V_{CRNK\_SIDE}$ at the second terminal 204-2 of the isolation switch 204. In some instances, the battery controller 140 may cause the isolation switch 204 to open and close responsive to one or both the vehicle load voltage $V_{VEH\_LOAD}$ and the crank side voltage $V_{CRNK\_SIDE}$ being less than or greater than a corresponding voltage threshold.

As one example, responsive to the isolation switch 204 being opened and the engine 102 being started, the battery controller 140 may monitor a difference between the crank side voltage $V_{CRNK\_SIDE}$ and the vehicle load voltage $V_{VEH\_LOAD}$. As another example, the battery controller 140 may command the isolation switch 204 to close responsive to a difference between the crank side voltage $V_{CRNK\_SIDE}$ and the vehicle load voltage $V_{VEH\_LOAD}$ being less a difference threshold.

As still another example, responsive to the isolation switch 204 being opened, the battery controller 140 may monitor a change in the crank side voltage $V_{CRNK\_SIDE}$ to meet the vehicle load voltage $V_{VEH\_LOAD}$ such that a difference between voltages at the terminals of the isolation switch 204 is less a difference threshold. Additionally or alternatively, the monitoring of the change in the crank side voltage $V_{CRNK\_SIDE}$ may be in response to the engine 102 being started using the starter motor 208 that is powered by the starter motor power source 202-2. The battery controller 140 may cause the isolation switch 204 to close responsive to a change in the crank side voltage $V_{CRNK\_SIDE}$ being such that a difference between respective voltages at the terminals 204-1 and 204-2 is less a difference threshold.

A change of the crank side voltage $V_{CRNK\_SIDE}$ may include a change from a first crank side voltage $V_{CRNK\_SIDE\_1}$ at a first time $t_1$ to a second crank side voltage $V_{CRNK\_SIDE\_2}$ at a second time $t_2$, where the second crank side voltage $V_{CRNK\_SIDE\_2}$ is one of greater than or less than the first crank side voltage $V_{CRNK\_SIDE\_1}$. In some examples, the first time $t_1$ may be a time when the engine 102 is started using the starter motor 208 and may occur chronologically and temporally subsequent to a null time to at which the isolation switch 204 is opened immediately prior to a same engine 102 starting event. Additionally or alternatively, the second time $t_2$ may be a time chronologically and temporally both subsequent to the first time $t_1$ and prior to a third time $t_3$ at which the isolation switch 204 is closed immediately following a same engine 102 starting event.

Figure 3:
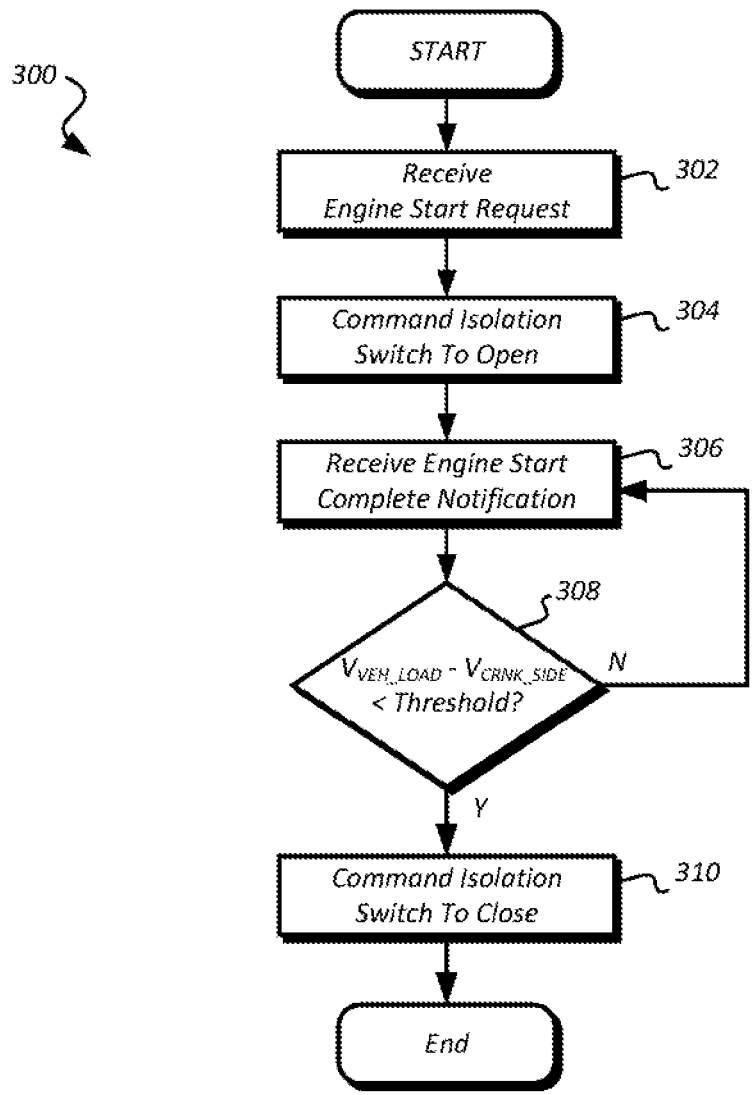
FIG. 3 is a flowchart illustrating an algorithm for operating an isolation switch.

FIG. 3 illustrates an example process 300 for isolating at least a portion of the low voltage bus 136 from other portions of the bus 136 and/or from all other electrical connections and components of the vehicle 100. The process 300 may begin at operation 302 where the battery controller 140 receives a signal indicative of a request to start the engine 102. For example, the hybrid powertrain controller 138 may send a signal to the battery controller 140 indicative of a request to start the engine 102 using mechanical engagement 210 of the starter motor 208 powered by the starter motor power source 202-2. Additionally or alternatively, the battery controller 140 may receive a request to start the engine 102 from one or more other vehicle controllers and/or battery and vehicle sensors, e.g., brake and/or accelerator pedal position sensor, crank angle sensor, clutch position sensor, and so on.

At operation 304, the battery controller 140 may command the isolation switch 204 to open to electrically isolate both the starter motor power source 202-2 and the starter motor 208 from all other electrical connections and components of the vehicle 100, e.g., all other low voltage connection 132 components, all high voltage connection 130 components, and so on. In one example, the isolation switch 204 may be a normally-open switch and the battery controller 140 may confirm that the switch 204 is open. As another example, responsive to confirming that the isolation switch is open both the starter motor power source 202-2 and the starter motor 208 are electrically isolated from all other electrical connections and components of the vehicle 100, the starter motor power source 202-2 may be configured to power the starter motor 208 to start the engine 102. As described in reference to at least FIG. 2, in some examples, the request to the start the engine 102 may be received from one or more other vehicle controllers and/or battery and vehicle sensors.

The battery controller 140 may receive a confirmation, at operation 306, that the engine 102 has been started. As some examples, the confirmation may be received from one or more sensors of the engine 102, the hybrid powertrain controller 138 in communication with the engine 102, and other in-vehicle network communication.

At operation 308, the battery controller 140 may determine whether a difference between respective voltages of the terminals 204-1 and 204-2 is less than a difference threshold. In one example, the battery controller 140 may monitor a difference between the crank side voltage $V_{CRNK\_SIDE}$ of the second terminal 204-2 and the vehicle load voltage $V_{VEH\_LOAD}$ of the first terminal 204-1. In another example, the battery controller 140 may monitor a change in the crank side voltage $V_{CRNK\_SIDE}$ to meet the vehicle load voltage $V_{VEH\_LOAD}$, such that a difference between the voltages $V_{VEH\_LOAD}$ and $V_{CRNK\_SIDE}$ is less than a difference threshold. In still another example, the battery controller 140 may monitor the crank side voltage $V_{CRNK\_SIDE}$ such that the voltage $V_{CRNK\_SIDE}$ changes from a first crank side voltage $V_{CRNK\_SIDE\_1}$ at a time when the engine 102 is started to a second crank side voltage $V_{CRNK\_SIDE\_2}$ at a time subsequent to a same engine 102 starting event, where the second crank side voltage $V_{CRNK\_SIDE\_2}$ is greater than the first crank side voltage $V_{CRNK\_SIDE\_1}$.

Responsive to the difference between respective voltages of the terminals 204-1 and 204-2 being greater than a difference threshold, the battery controller 140 may return to operation 306 where it may detect that the engine 102 has been started. Additionally or alternatively, the battery controller 140 may repeat the operation 308 over a predefined period of time, such that the voltage $V_{CRNK\_SIDE}$ changes from a first crank side voltage $V_{CRNK\_SIDE\_1}$ at a time when the engine 102 is started to a second crank side voltage $V_{CRNK\_SIDE\_2}$ at a time subsequent to a same engine 102 starting event, where the second crank side voltage $V_{CRNK\_SIDE\_2}$ is greater than the first crank side voltage $V_{CRNK\_SIDE\_1}$, to cause the difference between the voltages $V_{VEH\_LOAD}$ and $V_{CRNK\_SIDE}$ to become less than a difference threshold.

Responsive to the difference between the voltages $V_{VEH\_LOAD}$ and $V_{CRNK\_SIDE}$ being less than a difference threshold, the battery controller 140 may issue a command, at operation 310, to close the isolation switch 204. The process 300 may then end. In some embodiments, the process 300 may be repeated in response to receiving a request to start the engine 102 or another request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a first low-voltage power source being connected to a first low-voltage bus, wherein the first low-voltage power source supplies a first low-voltage to the first low-voltage bus;
   a starter motor connected to the first low-voltage bus;
   a high-voltage power source connected to a high-voltage bus;
   a DC-DC converter connected to the high-voltage bus and a second low-voltage bus, wherein the DC-DC converter is operable to convert a high-voltage provided by the high-voltage power source to a second low-voltage supplied to the second low-voltage bus;
   one or more accessory loads connected to the second low-voltage bus;
   an isolation switch operable to electrically connect and disconnect the first low-voltage bus from the second low-voltage bus; and
   a controller configured to,
      open the isolation switch responsive to a starter motor being operated by the first low-voltage to start an engine, wherein the one or more accessory loads may continue to be operable by the second low-voltage supplied by the DC-DC converter, and
      close the isolation switch responsive to the first low-voltage measured on the first low-voltage bus being substantially equal the second low-voltage measured on the second low-voltage bus, wherein the second low-voltage supplied by the DC-DC converter is operable to charge the first low-voltage power source.

2. The vehicle of claim 1 further comprising an electric machine connected to the high-voltage power source, wherein the electric machine and the first low-voltage power source are electrically disconnected when the isolation switch is open.

3. The vehicle of claim 2, wherein the electric machine is operable to charge the first low-voltage source when the isolation switch is closed.

4. The vehicle of claim 1, wherein the first low-voltage power source is a 12-volt battery.

5. The vehicle of claim 1, further comprising a second low-voltage power source connected to the second low-voltage bus.

6. The vehicle of claim 1, wherein the one or more accessory loads are powered by the second low-voltage power source when the isolation switch is open.

7. The vehicle of claim 5, wherein the second low-voltage power source is a 12-volt battery.

8. A method for a vehicle comprising:
   supplying a first low-voltage to a first low-voltage bus, wherein the first low-voltage is supplied by a first low-voltage power source, and wherein a starter motor is connected to the first low-voltage bus;
   supplying a high-voltage to a high-voltage bus, wherein the high-voltage bus is connected to a high-voltage power source;
   converting the high-voltage to a second low-voltage and supplying the second low-voltage to a second low-voltage bus;
   opening an isolation switch to electrically disconnect the first low-voltage bus from the second low-voltage bus when a starter motor is being operated by the first low-voltage to start an engine; and
   closing the isolation switch when the first low-voltage measured on the first low-voltage bus is substantially equal to the second low-voltage measured on the second low-voltage bus.

9. The method of claim 8, charging the first low-voltage source using an electric machine when the isolation switch is closed.

10. The method of claim 8, charging the first low-voltage source using the high-voltage power source when the isolation switch is closed.

11. The method of claim 8, supplying a third low-voltage from a second low-voltage power source connected to the second low-voltage bus.

12. The method of claim 11, powering one or more accessory loads using the second low-voltage power source when the isolation switch is open.

13. A vehicle comprising:
   a first low-voltage power source being connected to a first low-voltage bus, wherein the first low-voltage power source supplies a first low-voltage to the first low-voltage bus;
   a starter motor connected to the first low-voltage bus;
   a high-voltage power source connected to a high-voltage bus;
   a DC-DC converter connected to the high-voltage bus and a second low-voltage bus, wherein the DC-DC converter is operable to convert a high-voltage provided by the high-voltage power source to a second low-voltage supplied to the second low-voltage bus;
   one or more accessory loads connected to the second low-voltage bus;
   an isolation switch operable to electrically connect and disconnect the first low-voltage bus from the second low-voltage bus; and
   a controller configured to,
      open the isolation switch responsive to a starter motor being operated by the first low-voltage to start an engine, wherein the one or more accessory loads may continue to be operable by the second low-voltage supplied by the DC-DC converter, and
      close the isolation switch responsive to both the first low-voltage measured on the first low-voltage bus and the second low-voltage measured on the second low-voltage bus being within a predetermined voltage range.

14. The vehicle of claim 13 further comprising an electric machine connected to the high-voltage power source, wherein the electric machine and the first low-voltage power source are electrically disconnected when the isolation switch is open.

15. The vehicle of claim 14, wherein the electric machine and the high-voltage power source are operable to charge the first low-voltage source when the isolation switch is closed.

16. The vehicle of claim 13, wherein the first low-voltage power source is a 12-volt battery.

17. The vehicle of claim 13, further comprising a second low-voltage power source connected to the second low-voltage bus.

18. The vehicle of claim 17, wherein the one or more accessory loads are powered by the second low-voltage power source when the isolation switch is open.

\* \* \* \* \*